---

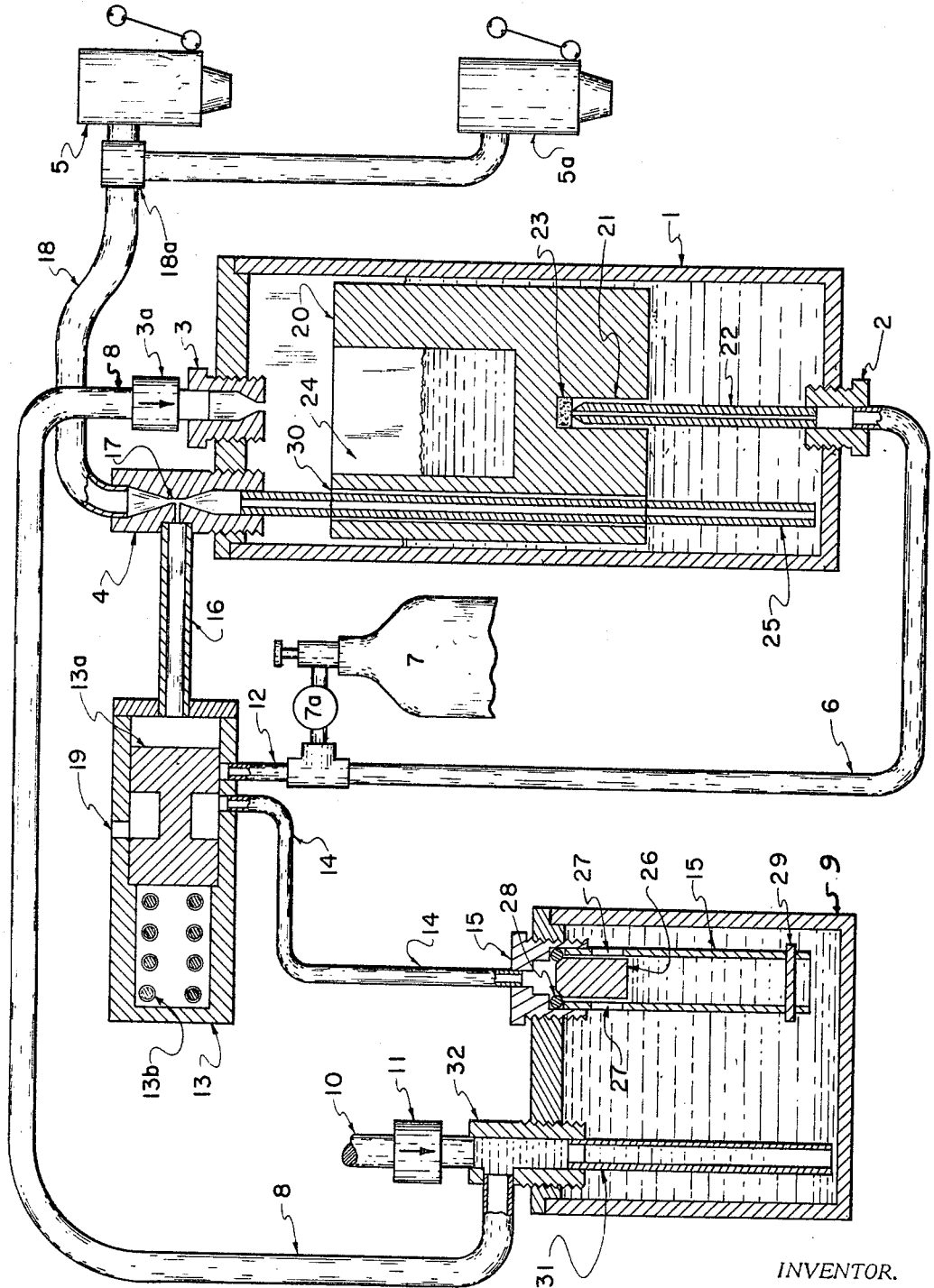

United States Patent Office 3,394,847
Patented July 30, 1968

---

3,394,847
GAS AND LIQUID ADMIXING SYSTEM
Bruce Garrard, 126 Montgomery Ferry Drive NE.,
Atlanta, Ga. 30309
Filed July 29, 1966, Ser. No. 568,833
15 Claims. (Cl. 222—56)

ABSTRACT OF THE DISCLOSURE

Disclosed herein is a gas and liquid mixing system which comprises a tank for mixing the gas and the liquid and includes a metering float to control the flow of gas into the mixing tank according to the liquid level in the mixing tank. A second tank is used to function as a pump tank and is interconnected by valve means to the mixing tank, to a source of gas under pressure, to a source of liquid and to the atmosphere to supply liquid under pressure to the mixing tank when the mixture of gas and liquid is being dispensed therefrom and to vent itself to atmosphere and refill with liquid when the mixture is not being dispensed.

---

This invention relates to a gas and liquid admixing system and more particularly to a carbonator system of a type known as a motorless carbonator and particularly well adapted for limited commercial use and for private or home use.

Admixing systems such as carbonators which are characterized by small or medium capacity ordinarily do not utilize a motor and pump mechanism but instead rely on the pressure from a source of gas such as carbon dioxide for performing or aiding in the performance of the mixing operation and also for establishing sufficient dispensing pressure within a mixing tank.

In systems of this type, it is necessary to provide some sort of means whereby the static pressure in the main mixing tank is less than the water pressure provided in order that water may be driven into the mixing tank. Heretofore this result has been accomplished, for example, by utilizing a regulator valve, responsive to liquid pressure from a source of liquid under pressure for throttling and thereby reducing the pressure of gas from the source of gas under pressure before it is introduced into the mixing tank. Another known arrangement utilizes two different mixing tanks arranged so that the mixed substance is withdrawn from one tank while the mixing process is accomplished in the other tank and a suitable control system is employed whereby gas is vented from the tank not in use to allow low pressure water to enter before gas pressure is again applied to slowly carbonate the water. Still another system utilizes a cylinder and double acting piston arrangement, the head end of the cylinder being connected with the source of gas under pressure and the so-called rod end of the cylinder being connected to the liquid source. Thus the rod portion of the piston effectively reduces the area of the piston at the rod end of the cylinder and thereby effects a pressure on the water higher than the gas pressure on the head end. The differential action thus renders the water pressure sufficient to force it into the head end where it mixes with gas before being dispensed at the end of the stroke. Still another arrangement may utilize a differential valve arranged to throttle or reduce the pressure of gas at the inlet port of the mixing tank in such a way that such pressure is below that of the liquid pressure at the liquid entrance of the mixing tank.

The various known arrangements perform adequate admixing operations in most instances but as can be readily understood from the above brief discussion, such systems are characterized by a number of moving parts and usually are unduly complicated in nature. They do not approach the combination of simplicity, compactness, versatility and low cost of this design.

A principal object of this invention is to provide an improved admixing system wherein dispensing and mixing pressure is derived from a single source of gas under pressure and wherein simple and reliable means responsive to the level of liquid in the mixing tank is utilized to throttle and thus reduce the static pressure within the tank by the simple expedient of throttling the inflow of gas at the inlet thereof.

Another object of this invention is the provision of an improved and versatile carbonator system wherein a high degree of simplicity is characteristic of the system and wherein a minimum number of moving parts is required.

Still another object of this invention is to provide an improved admixing system which is readily adaptable for use in conjunction with a source of liquid under pressure or in conjunction with a reservoir of liquid which is gravity fed, whereby water is pumped, carbonated instantaneously and dispensed, all in response to the opening of the dispensing valve.

A further object is to provide a simple pumping means employing pressurized gas and a pump tank that can be used to pump water to the carbonator tank, to force soft drink syrup from a gravity feed to a dispensing valve, or to drive any liquid from a gravity or pressure feed to any destination within the pressure limits of pressurized gas.

The invention in one form comprises a main tank, liquid inlet means formed in a wall of said main tank and interconnected with a source of liquid under pressure, a gas inlet means formed in a wall of said tank and disposed therein in said tank and interconnected with a source of gas under pressure, regulator means in the form of a metering float which responds to the level of liquid in the main tank to regulate the rate of flow of gas through the gas inlet in said tank and thereby to maintain the static pressure within the tank at a proper level relative to the pressure of the liquid source to control the liquid level in the tank, and dispensing means interconnected with said tank for drawing admixed liquid and gaseous substance therefrom.

According to a feature of the invention a pump tank is employed through which liquid is supplied to a main tank, such pump tank being vented to atmosphere in response to closing of the dispensing means and such tank being automatically interconnected through a float check valve with the source of gas under pressure by control means responsive to the rate of flow of admixed gas and liquid through said dispensing means.

For a better understanding of the invention reference may be had to the following detailed description taken in conjunction with the acompanying drawing which is a partial section view, depicting the essential elements of one form of the invention wherein liquid is supplied by gravity feed, or by pressure from a supply line. The drawing in intended to emphasize the operating principles involved and does not emphasize the extreme compactness possible.

With reference to the drawing, the numeral 1 is used to designate a main, carbonator or mixing tank having a gas inlet generally designated by the numeral 2 and a liquid inlet generally designated by the numeral 3 with a check valve at 3a. An outlet designated generally by the numeral 4 is formed in main or carbonator tank 1 and is interconnected with a dispensing valve of conventional construction and designated by the numeral 5. Of course it will be understood that gas supplied through inlet 2 is mixed with a liquid supplied through inlet 3 and the resulting mixture such as carbonated water is dispensed through outlet 4 and dispenser 5.

The gas inlet 2 is interconnected by means of a conduit 6 with a source of gas under pressure designated by the numeral 7. Ordinarily the source of gas under pressure 7 is in the form of a tank of $CO_2$ gas with a pressure regulator at 7a set at 125 p.s.i. approximately.

The liquid inlet designated by the numeral 3 is interconnected by check valve 3a and by means of a conduit 8 with a source of liquid which according to a feature of the invention preferably takes the form of a pump tank generally designated by the numeral 9. As is apparent in the drawing pump tank 9 is supplied with liquid through check valve 11, T connection 32 and dip tube 31 either by gravity or from a pressure system.

In order to force liquid from pump tank 9 through dip tube 31, T 32, conduit 8 and liquid inlet 3 into the interior of main tank 1, suitable pressure must be applied to the interior of pump tank 9. Such pressure is derived from the gas source 7 and is supplied to pump tank 9 by means of a conduit 12, control valve 13, conduit 14 and a float check valve 15.

Control 13 preferably is of the three way pilot type and is arranged to respond to a significant reduction in pressure in conduit 16 so as to interconnect conduits 12 and 14 and thereby to apply the full pressure from regulator 7a to the interior of pump tank 9.

Valve 13 is shown as a spool type three way valve with the spool 13a loaded by a compression spring 13b. In the position shown, the spool is forced to the left by high pressure from 16, where exhaust port 19 is connected to conduit 14. When low pressure exists in 16 the spring forces the spool to the right, closing port 19 and connecting 14 to 12. Three way pilot operated valves are available commercially in many forms which might be used successfully for this function. The construction shown is primarily for indicating function rather than details of construction.

Reduction in pressure in conduit 16 is effected by the throat type venturi designated by the numeral 17 which is formed as a part of the outlet 4 for main tank 1. Thus when the dispenser valve 5 is opened, a substantial flow of admixed substance is established in conduit 18 which interconnects outlet 4, venturi 17, and dispenser valve 5. Such significant flow through the dispensing apparatus causes a substantial pressure reduction in the throat of the venturi 17 and such reduction in pressure is transmitted through conduit 16 to control valve 13 and in this manner fluid pressure is supplied through control valve 13, conduits 12 and 14 to the interior of pump tank 9 from source of gas pressure 7. Dispenser valve 5 incorporates a restriction as standard practice to maintain a positive pressure in conduit 18 in order to prevent loss of carbonation from the water before it reaches 5.

Closing of dispenser valve 5 of course causes a cessation in the flow of admixed substance through conduit 18 and venturi 17 and hence raises the pressure in conduit 16. An increase in pressure in conduit 16 operates pilot control valve 13 in such a way as to vent the pump tank to atmosphere through conduit 14 and a port 19 of valve 13. Thus when the dispenser valve 5 is closed the interior of pump tank 9 is interconnected with atmosphere and a supply of liquid is fed by gravity or pressure from 10 through check valve 11.

When tank 9 refills with water, either by pressure or by gravity, there will be a tendency for water to flow out conduit 14 through the valve 13 and port 19 to atmosphere. If the water is pressure fed, say 10 p.s.i. or more, the float check valve 15 will prevent this. The plunger 26 is made of polypropylene or other material that will float in water. When the water level is low the plunger sinks toward pin 29 at the bottom of valve 15, permitting gas to escape through ports 27 and 19 without causing plunger 26 to rise and seat against O ring 28. But when the gas has escaped and water fills the tank 9, plunger 26 rises and contacts O ring 28 and seats. Thus 15 acts as a gas vent-liquid check means.

If the water is gravity fed, with a head of less than ten pounds per square inch the plunger will probably not seat against O ring 28 with a sufficient force to prevent leakage of water into conduit 14. In order to prevent the water flowing out port 19 to atmosphere, it is only necessary that valve 13 or some point in conduit 14 be higher than the water source. In this case the float check valve is not necessary and the plunger 26 could actually be removed, although it does not interfere with the operation at all.

In order for the flow of water from the pump tank 9 at 125 p.s.i. to enter the carbonator tank 1, means must be provided to maintain a lower pressure in tank 1 than in pump tank 9. Also if a gas atmosphere is to be maintained in the upper portion of tank 1 to insure proper mixing of the incoming water with gas, then means must be provided to maintain the water level somewhat below the top of the tank. Both of these functions are provided for by a unique feature of this invention, as follows.

A metering element 20, having a density preferably, but not necessarily, somewhat less than water, is provided with a cavity 21 which is arranged in telescoping relation to the gas inlet tube 22 connected with inlet 2. This cavity provides a convenient means of holding rubber seat 23 and making replacement easy through the threaded hole in the bottom of the tnak. The float and rubber seat rest on the top end of tube 22 and regulate the flow of gas into tank 1 to maintain a static pressure in tank 1 less than the supply pressure in conduit 6 (and 12) by an amount depending on the area at the top end of tube 22 and the net weight of element 20 resting on it.

Thus if the level of liquid inside main tank 1 is reduced, the net weight of metering element 20 is increased. This action tends to throttle the flow of gas into the tank 1 and furthermore tends to reduce the static pressure within the tank. If the level of liquid inside tank 1 rises, the net weight of metering element 20 decreases. This action tends to reduce the throttling action of the metering element 20 and also tends to have a lesser effect in reducing the pressure in tank 1. Thus according to a feature of this invention, the metering element 20 throttles and regulates as well as controls inflow of gas from source 7 and also effectively reduces the static pressure in tank 20 so that the pressure within pump tank 9 is always adequate to drive liquid from the pump tank 9 through conduit 8 and inlet 3 into the interior of main tank 1 when water is being dispensed.

This action of the element 20 also controls the level of water in tank 1. As the water level falls the static pressure in tank 1 falls and causes a faster flow of water into tank 1 from tank 9, which is at a constant pressure, until a point is reached that water coming into tank 1 is at the same rate as water leaving and the water level reaches an equilibrium point. If water should start coming in faster than that leaving, the water level would tend to rise, causing a higher static pressure in tank 1, which would reduce the rate of incoming water until equilibrium was again established.

Preferably the mixing of liquid and gas is facilitated according to a feature of this invention. For example the inlet 3 is constructed as a nozzle so as effectively to spray or jet the liquid into the upper portion of main tank 1. Furthermore a mixing chamber 24 is formed in the upper portion of metering element 20. Thus as is apparent in the drawing, liquid entering through the nozzle inlet 3 is held in close contact with the mixing chamber 24 and admixing action is thereby facilitated. In the drawing, a residue of water is shown in mixing chamber 24 during the off cycle, which churns and bubbles while water jets or sprays in during the on cycle.

Since the outlet for the admixed substance is preferably disposed at the top of the tank 1, it is necessary to interconnect the outlet 4 in the form of the venturi 17 with a dip tube designated by the number 25, the lower end of which is below the normally to be expected level of liquid within tank 1. The dip tube extends downward through a hole 30 in element 20.

It should be noted here that the dip tube may take the form of a small diameter tube that offers significant resistance to flow of the carbonated water. This could afford additional pressure drop for actuation of spool 13a, if needed, or it could be the only source of pressure drop if it should be desirable to eliminate the venturi throat at 17. By proper design either of these flow constricting means can afford enough pressure drop, or the two can be used together. The principal advantage of the venturi is that little energy is lost and the pressure drop caused by the increased velocity is largely regained when the water again slows down in conduit 18, affording a higher pressure to preserve carbonation on the way to valve 5. However, if valve 5 is close coupled to 4, or 18 is very short, this feature ceases to be important and the better design would probably be to have the dip tube provide all the pressure drop in the form of energy loss. A simpler valve 5 with little restriction or energy dissipation means could be used.

This system as shown is extremely versatile. It can use water fed by pressure or by gravity as described. If the water is under sufficient pressure, the carbonator tank will function perfectly without the pump tank even entering into the action at all. For example, if water is available at 125 p.s.i. or more, water would simply flow directly through 11 and conduit 8 to the inlet 3 without even entering the pump tank. Even though valve 13 actuated to permit $CO_2$ under 125 p.s.i. to flow through 14 float check valve 15, none would enter pump tank 9 since the pressure there would already be 125 p.s.i. or more. Actually in this case the 3 way valve and venturi 17 would not be needed either. 4 could be an orinary connector. With a pressure regulator supplying water at 125 p.s.i. to point 10, the element 20 would automatically cause water to enter at inlet 3 at the same rate it was drawn off through valve 5. When valve 5 closed, a small amount of water would flow into tank 1 until the water level rose enough to make 20 float, raising the $CO_2$ pressure in tank 1 to 125 p.s.i. and shutting off the flow of water, since there would be no pressure differential. It is important in this case that the amount of water entering after valve 5 closes be small. This is accomplished by making the clearance between element 20 and the inside of the tank small. The importance lies in the fact that this last amount of water enters at a reduced flow rate and does not cause as effective mixing with gas as water entering at the full flow rate.

It is also noteworthy that this carbonator will function quite well without the pump tank, valve 13, and venturi 17, even if the pressure of the water supply varies. With water being constantly supplied in conduit 8 at pressures varying from say 75 to 125 pounds per square inch, the element 20 will automatically cause the $CO_2$ pressure in tank 1 to be the correct amount below the water pressure so that water will flow into tank 1 at the same rate it flows out. With lower water pressure, the water level will simply fall in tank 1 until the effective weight of element 20 increases enough to lower the pressure to the point required.

Where the complete system is used, it is interesting to note that any number of valves may be connected to conduit 18, as at 18a, and operation of any one of them, such as 5a, will cause a pressure drop at 17 and actuate valve 13. It is of course obvious that valve 13 could be a mechanically operated valve, operated simultaneously with valve 5 manually or with linkage to the handle of valve 5, or that valve 5 and valve 13 could both be electrically operated valves connected in parallel and actuated simultaneously by an electric switch, the principal feature being that 13 is operable in coordination with 5 automatically or manually. Any of these methods would still come within the scope of this invention.

It should be noted that the design lends itself to being extremely compact primarily because the water is carbonated instantaneously at the same time as it is being dispensed. Because of this feature together with the simple control means in the tank, the carbonator tank can be less than two inches in diameter and less than four inches high, since no appreciable storage of carbonated water is required, compared to the common system that carbonates only when the water level walls to a certain point and stops only when the water level rises to a much higher point. Such a system normally employs a carbonator tank four and one-half inches to five inches in diameter and about ten inches high.

While particular arrangements of the invention have been shown and described, it will be understood that the invention is not limited thereto and it is intended in the appended claims to cover all such changes and modifications as fall within the true spirit and scope of the invention.

The embodiments of the invention in which an exclusive property or privilege is claimed are defined as follows:

1. A gas and liquid admixing system comprising a mixing tank, liquid inlet means formed in a wall of said tank and interconnected with a source of liquid, gas inlet means formed in a wall of said mixing tank, said gas inlet means being connected with a source of gas under pressure, regulator means responsive to changes in the level of liquid in said mixing tank and operably related with said gas inlet means for controlling the gas inlet to control the static pressure in said tank, and dispensing means for drawing the mixed substance from said tank, said regulator means responds to a reduction in the liquid level to reduce the gas pressure in said mixing tank and responds to an increase in the liquid level to increase the gas pressure in said mixing tank.

2. A system according to claim 1 wherein said regulator means responds to a reduction in the liquid level to reduce the rate of inflow of gas into said tank and wherein said regulator means responds to an increase in the liquid level to increase the rate of inflow of gas into said tank.

3. A system according to claim 1 wherein said dispensing means comprises a dispensing valve interconnected with an outlet in said tank through a flow constricting means.

4. A system according to claim 1 wherein said source of liquid comprises a pump tank arranged for interconnection with said source of gas under pressure.

5. A system according to claim 4 wherein said pump tank is interconnected with said source of gas under pressure through a control valve, a flow control constricting means positioned between the control valve and the mixing tank, said control valve being responsive to the rate of flow of mixed substance through said flow constricting means.

6. A system according to claim 5 wherein said control valve includes a vent for venting the pump tank in response to the closing of said dispensing means.

7. A system according to claim 6 wherein a source of liquid is arranged to supply liquid to said pump tank.

8. A system according to claim 7 wherein said pump tank is interconnected with said source of gas under pressure through a float check valve controlled by the level of liquid in said pump tank.

9. A mixing system comprising a mixing tank, an open ended inlet tube in said tank having an upstanding vertical inner portion and an outer portion connected with a source of gas, a metering element having a resilient seat which rests upon the inner end of said inlet tube, a water inlet formed in said tank and connected with a source of water under pressure, said metering element being partially immersed at a predetermined level of water in said tank effective to meter the inflow of gas into the mixing tank in response to the change in the level of the water in the mixing tank.

10. A mixing system according to claim 9 wherein a mixing chamber is formed in said metering element and disposed adjacent said water inlet and wherein said water inlet comprises a spray nozzle or jet.

11. A mixing system comprising a mixing tank, a pump tank connected to said mixing tank and to a source of water, a source of gas under pressure connected to said mixing tank, dispensing means connected to said mixing tank, and valve means connected to said source of gas under pressure and to said pump tank, a vent in the valve means, said valve means being operable in coordination with said dispensing means whereby coordinated opening of said dispensing means and operation of said valve means connects said source of gas under pressure to said pump tank to force water therefrom into said mixing tank, and coordinated closing of said dispensing means and reverse operation of said valve means connects said pump tank to atmosphere whereby gas is vented from said pump tank and water from said water source refills said pump tank.

12. A mixing system as in claim 11 wherein valve means positioned in said pump tank is adapted to vent the gas from the pump tank and to control the flow of liquid from the pump tank.

13. A carbonating system comprising a carbonator tank having means for mixing gas and water within said tank, a source of carbonating gas connected to said tank, pumping means connected to said tank and to a water supply, a dispensing valve connected to said tank, and control means connected to said pumping means and cooperable with said dispensing valve whereby simultaneous operation of said dispensing valve and of said control means actuates said pumping means and causes water to be pumped into said tank and mixed with carbonating gas at the same time and at the same rate as water-gas mixture is dispensed from said tank through said dispensing valve.

14. A pumping system comprising a pump tank, a liquid outlet connected to said pump tank, a check valve connected to said pump tank and to a source of liquid, and valve means connected to a source of gas under pressure, to said pump tank and a vent in the valve means, whereby actuation of said valve means connects said source of gas under pressure to said pump tank and thereby forces liquid out of said liquid outlet, and whereby reverse actuation of said valve means connects said pump tank to atmosphere and thereby vents gas from said pump tank, allowing liquid from said liquid source to flow through said check valve and into said pump tank to refill it.

15. A pumping system as in claim 14 wherein valve means positioned in said pump tank is adapted to vent the gas from the pump tank and to control the flow of liquid from the pump tank.

References Cited
UNITED STATES PATENTS

| | | | |
|---|---|---|---|
| 2,750,076 | 6/1956 | Welty et al. | 222—129.1 |
| 3,322,305 | 5/1967 | Tremolada | 222—67 X |

WALTER SOBIN, *Primary Examiner.*